United States Patent Office 3,080,357
Patented Mar. 5, 1963

3,080,357
REARRANGEMENT OF OXIME
HYDROCHLORIDES
Chao-Shing Cheng, Williamsville, and Richard G. Spaunburgh, Elma, N.Y., assignors to Allied Chemical Corporation, New York, N.Y., a corporation of New York
No Drawing. Filed Mar. 7, 1961, Ser. No. 93,841
4 Claims. (Cl. 260—239.3)

This invention relates to process for rearranging the hydrochlorides of cyclohexanone oxime to epsilon-caprolactam, and in particular relates to such rearrangement of crude oily cyclohexanone oxime hydrochlorides.

It has been proposed to convert cyclohexanone oxime hydrochlorides to caprolactam by adding the oxime hydrochlorides to hot sulfuric acid. The addition of cyclohexanone oxime hydrochlorides to hot sulfuric acid results in the copious evolution of corrosive hydrogen chloride. The oily hydrochlorides are themselves quite corrosive, so that carrying out the cited operations requires special equipment and great care. Furthermore, the yields obtained by the cited process starting with a crude oily cyclohexanone oxime hydrochloride such as results from reaction of nitrosyl chloride with cyclohexane are relatively low, being in the range of 60 to 80 percent of theory.

In accordance with the present invention epsilon-caprolactam is obtained in yields of 90% of theory and better from crude oily cyclohexanone oxime hydrochlorides containing between 1.5 and 2 mols of hydrogen chloride per mol of oxime, e.g. as obtained from the photochemical nitrosation of cyclohexane by nitrosyl chloride.

In our process a first step is to strip hydrogen chloride and volatile impurities from said crude oxime hydrochloride until the hydrogen chloride content of the oxime hydrochloride is in the range between about one mol and about 1.5 mols per mol of oxime and the resulting cyclohexanone oxime hydrochloride is crystallizable at room temperatures, i.e. at temperatures in the range 15°–30° C. We have found that a better product for subsequent rearrangement is obtained when this stripping step is conducted with a relatively volatile saturated hydrocarbon liquid present, suitably a hydrocarbon liquid of normal boiling point in the range between about 65° C. and about 150° C.

We then cool the stripped oxime hydrochloride-hydrocarbon liquid mixture thereby forming a slurry of crystallized oxime hydrochloride in said hydrocarbon liquid. This oxime hydrochloride slurry is then admixed with sulfuric acid in molecular proportions amounting to at least about 1:1 of sulfuric acid:oxime and at temperatures at which hydrogen chloride is evolved but no substantial rearrangement of oxime occurs. A solution of oxime in sulfuric acid thereby results, which forms a separate phase from the hydrocarbon liquid. This solution is separated from the hydrocarbon liquid layer, and is then subjected to Beckmann rearrangement conditions as known in the art. An excellent yield in the rearrangement is obtained by contacting the solution with sulfuric acid containing not above about 25% by weight of water including any water accompanying the oxime and heating the resulting Beckmann rearrangement reaction mixture to temperatures in the range between about 80° C. and about 200° C. until the rearrangement has been effected.

In accordance with a preferred embodiment of our invention crude cyclohexanone oxime dihydrochloride resulting from reaction of nitrosyl chloride with cyclohexane is mixed with cyclohexane in amount suitably at least about one-half the weight of crude oxime dihydrochloride starting material. This cyclohexane can be all provided initially or can be provided incrementally as the stripping operation proceeds. Other relatively volatile saturated hydrocarbon liquids can be used with like effect, e.g. n-hexane; n-heptane; methylcyclohexane; and sulfuric acid washed, distilled petroleum fractions boiling predominantly in the range between 65° C. and 150° C. The amount used should at least suffice to keep the oxime hydrochloride from boiling dry, and can be much larger than such minimum, e.g. 10- or 20-fold the weight of the crude oxime hydrochloride.

The mixture is stripped, suitably by heating at atmospheric pressure, with evolution of hydrogen chloride, volatile impurities, and organic vapors including cyclohexane vapors until the hydrogen chloride content of the residual oxime hydrochloride approximates that of cyclohexanone oxime monohydrochloride. If desired, a current of air or other gas can be used to aid the stripping step. The residue is cooled to not above 30° C., thereby causing the separation of solid cyclohexanone oxime monohydrochloride from the residual cyclohexane or other hydrocarbon liquid.

To the resulting slurry then is added a quantity of concentrated sulfuric acid, preferably 100% sulfuric acid, providing at least about 1:1 mol ratio of sulfuric acid:oxime, while maintaining the temperature of the mixture in the range between about 15° C. and about 45° C. A moderate deficiency of acid can be used but is not generally desirable since the evolution of hydrogen chloride will then not be completed at this step. An excess of acid can be used, say 10 fold or 20 fold excess, but large excesses of acid are uneconomic since the acid is later neutralized. A convenient excess of acid is about 50 percent.

Sulfuric acid of varying strengths can be used in place of the preferred 100% sulfuric acid. Thus dilute acid, e.g. 50% sulfuric acid, can be used in forming the solution of oxime in sulfuric acid. It will be obvious to those skilled in the art, that the more dilute the sulfuric acid, the less hydrogen chloride will be evolved in view of the solubility of hydrogen chloride in water. Accordingly in this step, concentrated sulfuric acid, especially 100% or stronger sulfuric acid will be preferred over dilute acid.

Temperatures in the range 15° C.–45° C. are convenient for the step of forming oxime solution in sulfuric acid but do not represent the entire useful range. Considerably higher temperatures, such as 70° C. for example, can be used when corresponding care is taken to avoid a rise in temperature sufficient to initiate rearrangement.

This addition of acid is followed by a phase separation between the sulfuric acid layer containing the oxime, and the cyclohexane layer. The acid layer is separated and contacted at a controlled rate with hot concentrated sulfuric acid, preferably 100% sulfuric acid maintained preferably at about 100° C. A convenient method is to add this acid layer gradually to a pool of rearrangement reaction product mixture containing sulfuric acid, maintained at rearrangement temperatures. The resulting rearrangement reaction mixture is kept heated until the rearrangement is complete, after which the caprolactam product is isolated in the usual manner, e.g. by drowning in water, neutralizing excess acid, separating the caprolactam layer, and distilling or otherwise purifying the crude caprolactam.

In the rearrangement step sulfuric acid with as much as 25% water content can be used and more concentrated acid than 100% sulfuric acid, e.g. 26% oleum, can be used successfully. Preferably 100% sulfuric acid is used in both of these steps in our process. Other agents of Beckmann rearrangement can be used in addition to or instead of sulfuric acid, e.g. chlorsulfonic acid, phosphorus pentachloride or other acid chlorides, etc.

The following example will illustrate the process of our invention and the best mode contemplated by us of carrying out our invention but the invention is not to be interpreted as limited to all details of the example. Parts and percentages are by weight and the temperatures are given in degrees centigrade.

EXAMPLE

*Part A.*—There was added 2337 parts of cyclohexane to 3360 parts of crude oily cyclohexanone oxime hydrochloride, containing 1343 parts of cyclohexanone oxime, produced by the reaction of cyclohexane and nitrosyl chloride under ultraviolet irradiation in the presence of hydrogen chloride, benzene as solvent of byproducts, and methanol as catalyst.

This cyclohexane/oxime hydrochloride mixture was heated at atmospheric pressure whereby hydrogen chloride was evolved and passed off, together with vapors of impurities and benzene and cyclohexane vapors. This operation was continued until the composition of the residual oxime hydrochloride approximated the oxime monohydrochloride, the vapor temperature being 76.5° when the heating was discontinued.

The resulting stripped residue was cooled to about 25°, whereupon the oxime monohydrochloride crystallized from the residue, forming a slurry.

To the slurry thus obtained was added 1779 parts of 100% sulfuric acid dropwise. The temperature rose slightly at the start of the addition but thereafter gradually fell. Hydrogen chloride was evolved and was collected for reuse. Two phases resulted, a cyclohexane layer and a sulfuric acid layer containing about 38% by weight of cyclohexanone oxime dissolved therein, said acid layer weighing 3516 parts. A portion of the acid layer (816 parts) was added at the rate of 12.9 parts/minute (corresponding to 4.94 parts free oxime) to an agitated pool of 113 parts of caprolactam and 150 parts of 100% sulfuric acid while maintaining the temperature of the resulting reaction mixture between 100° and 103°. Following the addition of the sulfuric acid solution of oxime, the mass was heated on a steam bath for 75 minutes and thereafter cooled to ambient temperature.

Ice, in the amount of 1120 parts, was added to the cooled mass and then gaseous ammonia was bubbled into the mass until the pH thereof had risen to 4.8. The resulting upper layer of crude caprolactam was separated and purified by distillation. 377 parts of epsilon-caprolactam were collected at 130°/7.5 mm. The lower aqueous layer was extracted with ether to yield an additional 26 parts of caprolactam. A total of 403 parts or 94.8% of theory was obtained.

*Part B.*—When, by way of comparison, samples of crude oily cyclohexanone oxime hydrochlorides from the same source as that used in the above part A were added gradually and simultaneously with 100% sulfuric acid separately added, in the same proportions of acid:oxime as above, to a pool of caprolactam and sulfuric acid as used in part A maintained as in part A at 100°–103° C., the resulting yields of caprolactam were variable and were in the range of 60%–80% of theory.

Although we do not intend to be bound by theories as to our process, we believe the unexpectedly higher yields obtained in our process are due to removal (or innocuous reaction) of deleterious impurities, by the stripping step in presence of saturated hydrocarbon liquid employed in our process in cooperation with the succeeding steps of crystallizing oxime monohydrochloride, dissolving the oxime monohydrochloride in sulfuric acid, and separating the resulting solution from the accompanying hydrocarbon liquid layer.

It can be seen that an effective and economical process has been devised for the preparation of epsilon-caprolactam. It will be appreciated also that the above example is illustrative of our invention and that many variations in the details thereof can be made without departing from the scope or spirit of our invention.

As one variant along the foregoing lines, our process can be carried out continuously, the oily oxime hydrochloride being stripped in presence of hydrocarbon liquid in a still operating under constant conditions. The residue is continuously withdrawn and cooled, and the resulting oxime hydrochloride slurry is fed continuously with sulfuric acid to a continuous separator from which the sulfuric acid solution of the oxime is withdrawn to the rearrangement vessel. The rearrangement can be effected continuously, by continuously withdrawing, e.g. as overflow, the increment of the rearrangement reaction mixture, as feed is supplied thereto; and the neutralization and separation of caprolactam can similarly be made continuous.

We claim:

1. Process for conversion of a crude oily hydrochloride of cyclohexanone oxime, containing between about 1.5 and about 2 mols of hydrogen chloride per mol of oxime, to epsilon-caprolactam which process comprises stripping hydrogen chloride and volatile impurities from said crude oxime hydrochloride with a saturated hydrocarbon liquid of normal boiling point in the range between about 65° C. and about 150° C. present, until the hydrogen chloride content of the oxime hydrochloride is within the range between about 1 mol and about 1.5 mols per mol of oxime and the resulting oxime hydrochloride is crystallizable as a free-flowing slurry in the remaining hydrocarbon liquid at temperatures in the range of 15°–30° C.; cooling to crystallize the oxime hydrochloride and form a free-flowing slurry thereof in said hydrocarbon liquid; admixing said slurry with sulfuric acid in molecular proportions amounting to at least about 1:1 of sulfuric acid:oxime and at temperatures at which hydrogen chloride is evolved but no substantial rearrangement of oxime occurs; separating the resulting solution of oxime in sulfuric acid from the hydrocarbon liquid layer; and then forming a Beckmann rearrangement reaction mixture by contacting the solution of oxime with an agent of Beckmann rearrangement, and subjecting this reaction mixture to Beckmann rearrangement conditions of temperature and time.

2. Process as defined in claim 1 wherein the starting material is a crude oily cyclohexanone oxime hydrochloride resulting from reaction of nitrosyl chloride with cyclohexane; the hydrocarbon liquid is cyclohexane provided in total amount at least about one-half the weight of the crude oily cyclohexanone oxime hydrochloride starting material; the sulfuric acid used has concentration of at least 50 percent; and the temperature during the step of admixing the slurry with sulfuric acid is maintained between about 15° C. and about 45° C.

3. Process as defined in claim 2 wherein the Beckmann rearrangement agent is sulfuric acid containing not more than about 25% by weight of water including any water accompanying the oxime, and the rearrangement reaction mixture is heated to temperatures in the range between about 80° C. and about 200° C.

4. Process as defined in claim 3 wherein the sulfuric acid used in the admixing step and that used in the rearrangement step have concentration of about 100%; the solution of oxime in sulfuric acid is contacted with sulfuric acid to form the Beckmann rearrangement mixture by gradually adding the sulfuric acid solution to a pool of the heated rearrangement reaction product mixture containing sulfuric acid; and the temperature of the rearrangement reaction mixture is maintained at about 100° C.

References Cited in the file of this patent

UNITED STATES PATENTS 2,797,216    Wagner et al.    June 25, 1959
2,945,885    Von Schickh et al.    July 19, 1960